United States Patent
Lee et al.

(10) Patent No.: US 12,185,853 B2
(45) Date of Patent: Jan. 7, 2025

(54) CUP HOLDING APPARATUS AND SERVING ROBOT APPARATUS INCLUDING THE SAME

(71) Applicant: SAMSUNG ELECTRONICS CO., LTD., Suwon-si (KR)

(72) Inventors: Minhee Lee, Suwon-si (KR); Sanghyun Kang, Suwon-si (KR); Hyunsuk Kwak, Suwon-si (KR); Donghan Koo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 17/825,721

(22) Filed: May 26, 2022

(65) Prior Publication Data
US 2022/0408952 A1 Dec. 29, 2022

Related U.S. Application Data (63) Continuation of application No. PCT/KR2022/005924, filed on Apr. 26, 2022.

(30) Foreign Application Priority Data

Jun. 25, 2021 (KR) .......................... 10-2021-0083070
Nov. 12, 2021 (KR) .......................... 10-2021-0155967

(51) Int. Cl.
*A47G 23/02* (2006.01)
*B25J 11/00* (2006.01)
(Continued)

(52) U.S. Cl.
CPC ......... *A47G 23/0225* (2013.01); *B25J 11/008* (2013.01); *A47G 2400/086* (2013.01); *B60R 2011/0089* (2013.01); *F16M 11/123* (2013.01)

(58) Field of Classification Search
CPC .................. F16M 11/123; B63B 29/12; A47G 2400/086; A47G 23/0208; A47G 23/0216; A47G 23/0225; B60D 1/52; B60D 1/485
(Continued)

(56) References Cited

U.S. PATENT DOCUMENTS 1,244,158 A * 10/1917 Zagmester .............. B63B 29/12
 108/1
5,190,000 A * 3/1993 van Schaik ............. F01L 1/183
 74/519
(Continued)

FOREIGN PATENT DOCUMENTS

CN 206825432 U 1/2018
CN 208435159 U * 1/2019
(Continued)

OTHER PUBLICATIONS

International Search Report (PCT/ISA/210) issued Jul. 22, 2022 by the International Searching Authority in International Application No. PCT/KR2022/005924.
(Continued)

*Primary Examiner* — Scott T McNurlen
(74) *Attorney, Agent, or Firm* — Sughrue Mion, PLLC (57) ABSTRACT

A cup holding apparatus and a serving robot including the cup holding apparatus are provided. The cup holding apparatus may include a first support member configured to support a cup and having a lower surface that has convex shape; a second support member having an upper surface that has a concave shape and faces the lower surface of the first support member; a third plate provided between the first support member and the second support member; and a plurality of rolling members that pass through and are
(Continued)

rotatably supported by the third plate, and contact the lower surface of the first support member and the upper surface of the second support member.

17 Claims, 7 Drawing Sheets (51) Int. Cl.
  *B60R 11/00* (2006.01)
  *F16M 11/12* (2006.01)
(58) Field of Classification Search
  USPC .................. 248/638, 133; 224/926; 220/738
  See application file for complete search history.

(56) References Cited

U.S. PATENT DOCUMENTS

| | | | | |
|---|---|---|---|---|
| 5,795,078 | A * | 8/1998 | Li | ........................... F16C 33/40 |
| | | | | 384/490 |
| 8,789,806 | B2 | 7/2014 | Taylor et al. | |
| 9,597,992 | B2 * | 3/2017 | Ghyvoronsky | ........ B60N 3/101 |
| 9,802,522 | B2 * | 10/2017 | Ghyvoronsky | .......... B60N 3/10 |
| 2005/0269471 | A1 | 12/2005 | Wagner | |
| 2006/0237499 | A1 | 10/2006 | Teichrieb | |
| 2014/0251494 | A1 | 9/2014 | Stieger et al. | |
| 2015/0314718 | A1 | 11/2015 | Ghyvoronsky | |
| 2020/0290208 | A1 * | 9/2020 | Ha | ....................... G05D 1/0246 |

FOREIGN PATENT DOCUMENTS

| | | |
|---|---|---|
| JP | 10-61250 A | 3/1998 |
| JP | 2005-178411 A | 7/2005 |
| JP | 2009-261860 A | 11/2009 |
| JP | 3208327 U | 1/2017 |
| KR | 98-8751 A | 4/1998 |
| KR | 1999-011412 U | 3/1999 |
| KR | 10-2006-0075358 A | 7/2006 |
| KR | 20-2011-0001167 U | 2/2011 |
| WO | WO-2021125739 A1 * | 6/2021 .......... B25J 11/0045 |

OTHER PUBLICATIONS

Written Opinion (PCT/ISA/237) issued Jul. 22, 2022 by the International Searching Authority in International Application No. PCT/KR2022/005924.
Communication dated Sep. 13, 2024, issued by the European Patent Office in European Application No. 22828591.2.

* cited by examiner

CUP HOLDING APPARATUS AND SERVING ROBOT APPARATUS INCLUDING THE SAME

CROSS-REFERENCE TO RELATED APPLICATION(S)

This application is a bypass continuation of International Application No. PCT/KR2022/005924, filed on Apr. 26, 2022, which is based on and claims priority to Korean Patent Application No. 10-2021-0083070, filed on Jun. 25, 2021, in the Korean Intellectual Property Office and Korean Patent Application No. 10-2021-0155967, filed on Nov. 12, 2021, in the Korean Intellectual Property Office, the disclosures of which are incorporated by reference herein in their entireties.

BACKGROUND

1. Field

The disclosure relates to a cup holding apparatus and a serving robot apparatus including the same and, more specifically, to a cup holding apparatus capable of stably delivering a cup by responding to vibration insensitively and a serving robot apparatus including the same.

2. Description of Related Art

With the development of the robot technology, a robot that carries an object (e.g., a cup containing a beverage) to a designated location in a restaurant or the like has been developed. However, when the robot rapidly accelerates or decelerates, the robot collides with an obstacle, or a ground surface is uneven, there may be a problem in that vibration may be transmitted to the object. As a result, in the case of the robot carrying a cup containing beverage, the cup may fall down or over or the beverage may be separated from the cup.

SUMMARY

Provided are a cup holding apparatus capable of stably delivering a cup by reacting with vibration insensitively and a serving robot apparatus including the same.

According to an aspect of the disclosure, a cup holding apparatus includes: a first support member configured to support a cup and having a lower surface that has convex shape; a second support member having an upper surface that has a concave shape and faces the lower surface of the first support member; a third plate provided between the first support member and the second support member; and a plurality of rolling members that pass through and are rotatably supported by the third plate, and contact the lower surface of the first support member and the upper surface of the second support member.

The third plate may include a first central hole, and the cup holding apparatus may further include a block member that protrudes toward the second support member from the lower surface of the first support member and is disposed in the first central hole.

The block member may have a cylindrical shape.

An outside diameter of the block member may be smaller than an inside diameter of the first central hole.

The second support member may include a second central hole, and the block member may pass through the first central hole and is disposed in the second central hole.

The block member may include a third central hole configured to surround a lower region of the cup and support a lower surface of the cup.

The plurality of rolling members may be disposed along a circumferential direction of the third plate.

The third plate may have a cylindrical shape.

The cup holding apparatus may further include a block member that protrudes from the lower surface of the first support member toward the second support member.

The second support member may include a sidewall that surrounds the upper surface of the second support member and extends to a level that is higher than the upper surface of the second support member.

The first support member may include a holder configured to surround a lower region of the cup.

According to an aspect of the disclosure, a serving robot apparatus includes: a main body; a driving device configured to move the main body; a cup holding apparatus horizontally supported by the main body, wherein the cup holding apparatus includes: a first support member configured to support a cup and having a lower surface that has convex shape; a second support member having an upper surface that has a concave shape and faces the lower surface of the first support member; a third plate provided between the first support member and the second support member; and a plurality of rolling members that pass through and are rotatably supported by the third plate, and contact the lower surface of the first support member and the upper surface of the second support member.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Example embodiments described hereinafter are for easy understanding of the disclosure, and it should be understood that various changes can be made to examples described herein and the disclosure can be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

The terms used in the present specification and the claims are general terms identified in consideration of the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

In this specification, the expressions "have," "may have," "include," or "may include" or the like represent presence of a corresponding feature (for example: components such as numbers, functions, operations, or parts) and does not exclude the presence of additional feature.

Since the components required for the description of each embodiment of the disclosure have been described herein, the embodiment is not limited thereto. Thus, some components may be modified or omitted and other components may be added. In addition, the components may be distributed and arranged in different independent devices.

Furthermore, although the embodiments of the disclosure will be described in detail with reference to the accompanying drawings and the contents set forth in the accompanying drawings, the disclosure is not limited to the embodiments.

Hereinafter, embodiments of the disclosure will be described in greater detail with reference to the attached drawings.

Figure 1:
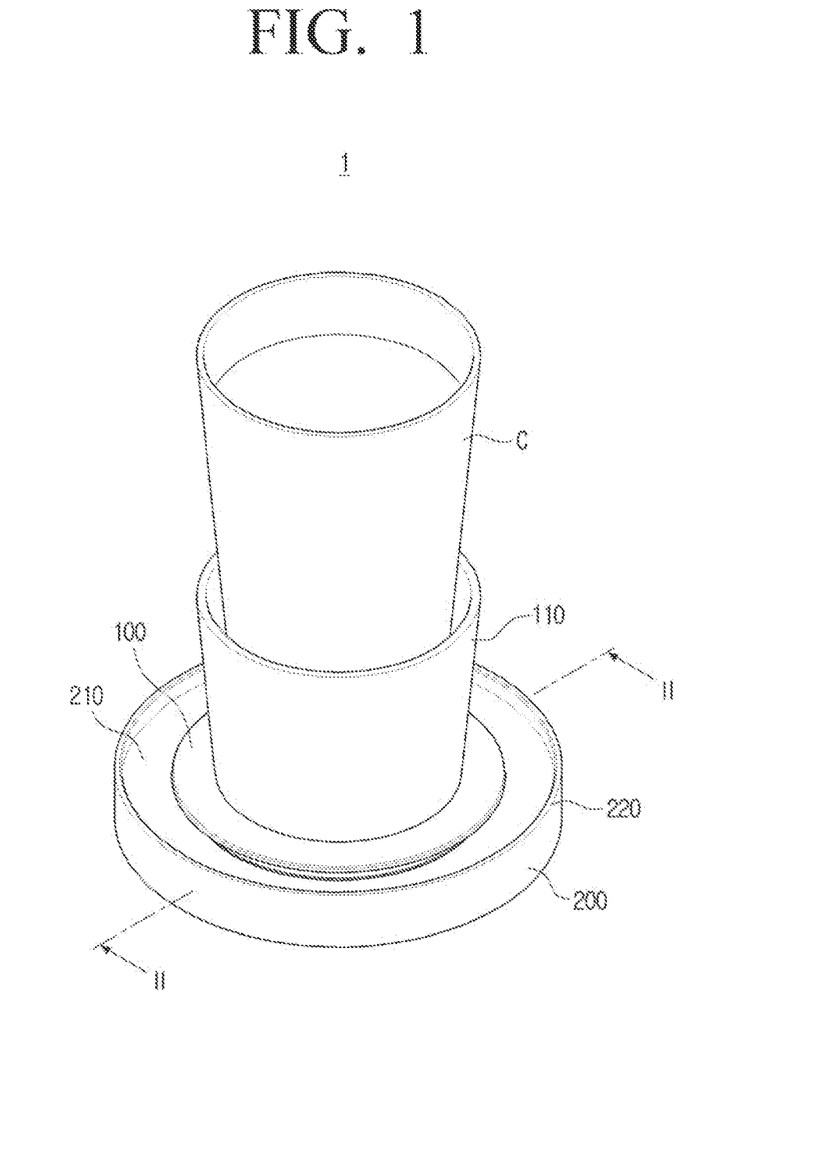
FIG. 1 is a perspective view of a cup holding apparatus according to an embodiment of the disclosure.
Figure 2:
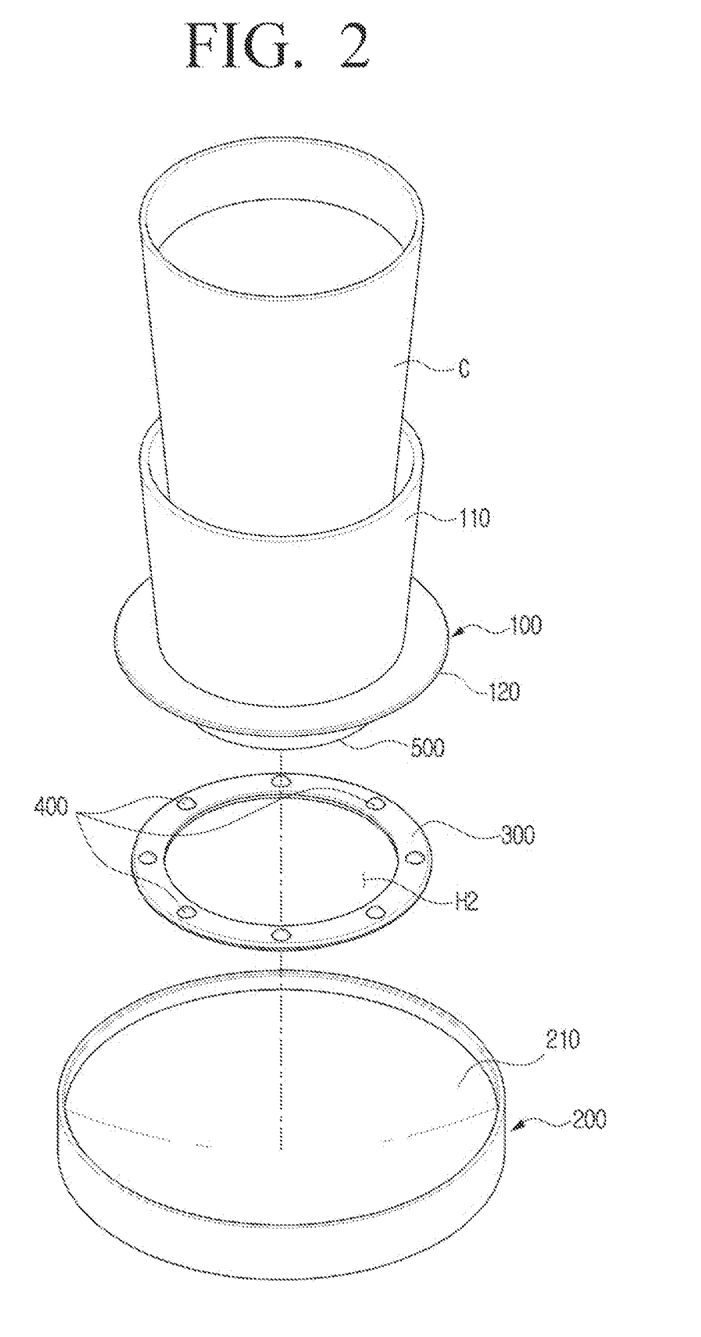
FIG. 2 is an exploded perspective view of the cup holding apparatus of FIG. 1.
Figure 3:
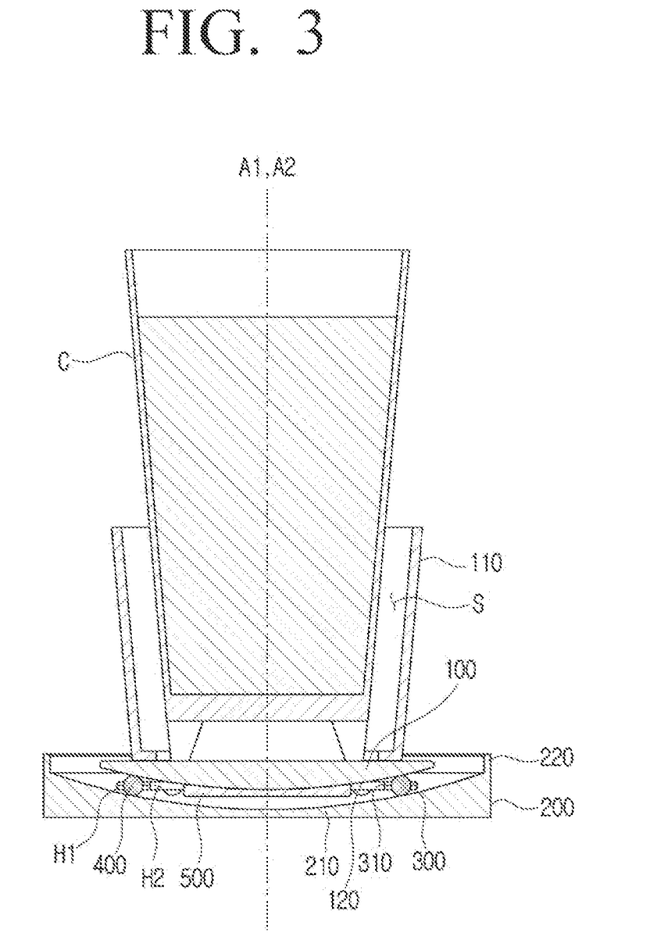
FIG. 3 is a cross-sectional view of the cup holding apparatus taken along II-II line of FIG. 1.

FIG. 1 is a perspective view of a cup holding apparatus according to an embodiment of the disclosure. FIG. 2 is an exploded perspective view of the cup holding apparatus of FIG. 1. FIG. 3 is a cross-sectional view of the cup holding apparatus taken along II-II line of FIG. 1.

Referring to FIGS. 1 to 3, a cup holding apparatus 1 according to an embodiment of the disclosure may include a first support member 100, a second support member 200, a third plate 300, a rolling member 400, and a block member 500.

The cup holding apparatus 1 may have a structure for attenuating vibration transferred to the first support member 100 supporting a cup C from the second support member 200 so that the liquid contained in the cup C is not discharged to the outside of the cup C when the cup C is delivered to a specific location.

The first supporting member 100 and the second supporting member 200 may have an isolation structure in which the first supporting member 100 and the second supporting member 200 are spaced apart from each other, and a rolling member 400 which is in contact with both the first and second supporting members 100 and 200 for rolling movements may be provided therebetween.

Accordingly, the first support member 100 and the second support member 200 may move relative to each other at different speeds. As the rolling member 400 performs a rolling movement, the first support member 100 may move relative to the second support member 200 with a sufficiently small frictional force, so that the vibration transmitted to the first support member 100 supporting the cup C from the second support member 200 may be attenuated. As a result, the vibration of the first support member 100 may be reduced relative to the vibration of the second support member 200.

Hereinafter, with reference to the drawings, a structure of the cup holding apparatus 1 according to an embodiment will be described in detail.

The first support member 100 may support a lower region of the cup C. For example, the first support member 100 may include a holder 110 having a receiving space S concavely formed toward a lower side thereof.

A portion of the cup C may be received within the receiving space S of the holder 110. As a sidewall of the holder 110 is disposed to surround the cup C, the cup C may be stably supported by the holder 110 without falling or tipping over.

If the cup C is to be delivered to a particular location, a user may place the cup C in the receiving space S of the holder 110 supported by the first support member 100. The cup C may move while being supported by the holder 110 of the first support member 100.

The lower surface 120 of the first support member 100 may be convexly formed toward the lower side. The lower surface 120 of the first support member 100 may be convexly formed toward the upper surface 210 of the second support member 200.

For example, the lower surface 120 of the first support member 100 may be formed as a curved surface having a predetermined radius of curvature from a virtual point formed on the upper side of the cup holding apparatus 1. The first support member 100 may be formed symmetrically with respect to a first axis A1.

The second support member 200 may have an approximately cylindrical shape and may be disposed at the lowermost side of the cup holding apparatus 1. The second support member 200 may be spaced apart from the first support member 100. The diameter of the second support member 200 may be larger than the diameter of the first support member 100.

Figure 7:
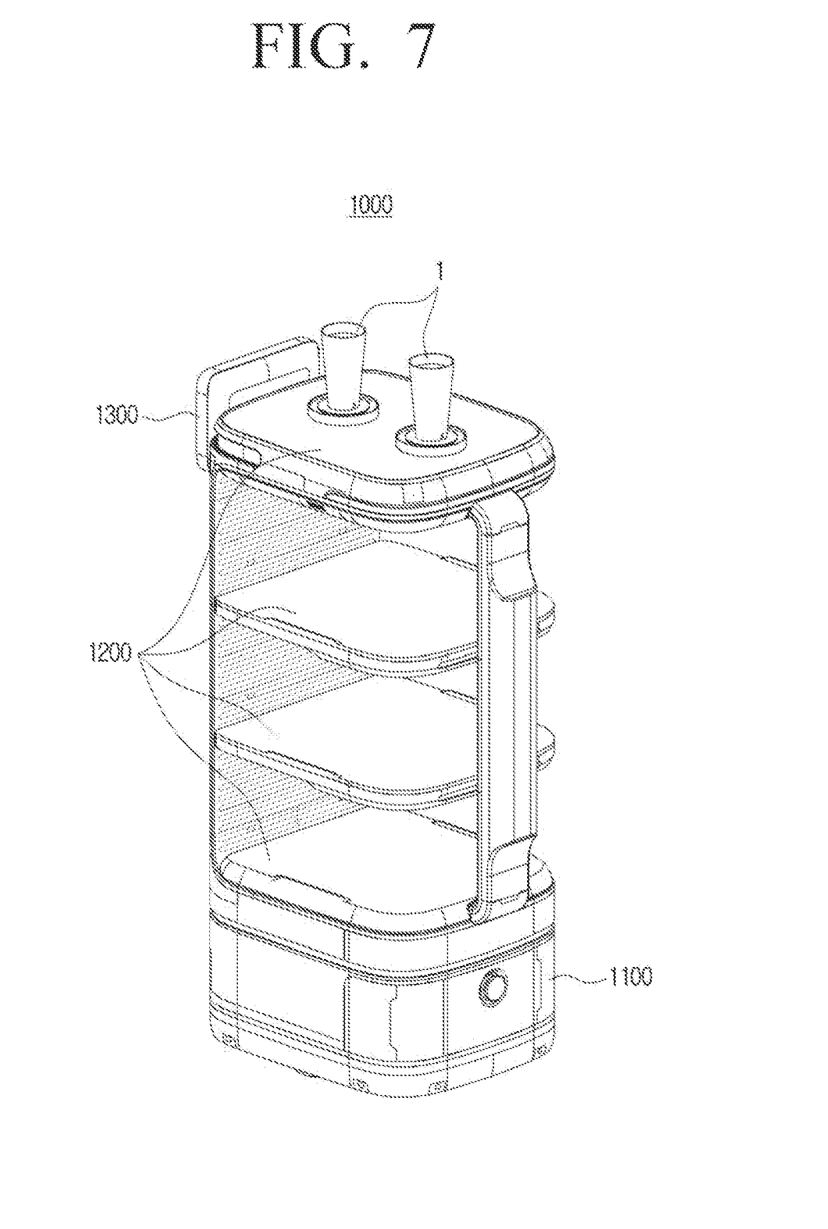
FIG. 7 is a perspective view of a serving robot apparatus according to an embodiment of the disclosure.

The second support member 200 may be a part of a serving robot apparatus 1000 to be described later, such that the second support member 200 may move at a speed which is the same as the speed of the serving robot apparatus 1000.

The second support member 200 may receive vibration of the serving robot apparatus 1000 generated according to the vibration of the severing robot apparatus generated by acceleration or deceleration of the serving robot apparatus 1000 or vibration of the serving robot apparatus 1000 generated due to a shape of the ground surface.

An upper surface 210 of the second support member 200 may be disposed opposite to the lower surface 120 of the first support member 100 and may be concavely formed. For example, the upper surface 210 of the second support member 200 may be formed as a curved surface having a predetermined radius of curvature from a virtual one point formed on the upper side of the cup holding apparatus 1. The second support member 200 may be formed symmetrically with respect to the second axis A2.

The second support member 200 may include a sidewall 220 surrounding the upper surface 210 of the second support member 200. The sidewall 220 of the second support member 200 may be disposed at an outer end of the second support member 200 to be higher than the upper surface 210 of the second support member 200.

The third plate 300 may be disposed between the first support member 100 and the second support member 200. The third plate 300 may have a circular shape section, and the third plate 300 may have a cylindrical shape.

A plurality of rolling members 400 may be provided, and may be rotatably supported by the third plate 300. The plurality of rolling members 400 may rotate in a state of being disposed at a specific position of the third plate 300. The plurality of rolling members 400 may be disposed along a circumferential direction of the third plate 300.

The third plate 300 may include at least one receiving hole H1 formed in the same number as a number of at least one rolling member 400. The receiving hole H1 may be formed by penetrating the third plate 300 in the thickness direction. The plurality of rolling members 400 may be supported by the third plate 300 as each of the rolling members 400 is inserted into the receiving hole H1.

Since the upper surface 210 of the second support member 200 has an area corresponding to the second axis A2 to be concavely formed to have the lowest position, so the third plate 300 and the rolling member 400 may return to the center of the second support member 200 again due to gravity when the third plate 300 and the rolling member 400 are deviated from the center of the second support member 200.

The third plate 300 and the rolling member 400 may have a pendulum movement with respect to the second axis A2 of the second support member 200 on the upper surface 210 of the second support member 200. In addition, since the convex lower surface of the first support member 100 is supported by the rolling member 400, pendulum movement may be performed about the second axis A2 of the second support member 200.

Accordingly, the cup C may be tilted while performing a pendulum movement along a specific arc trajectory, and liquid accommodated in the cup C may be tilted at the same angle as the cup C, so that the liquid accommodated in the cup C may not be discharged to the outside of the cup C.

The plurality of rolling members 400 may be disposed symmetrically with respect to the central axis of the third plate 300. The rolling member 400 may be in contact with the lower surface 120 of the first support member 100 and the upper surface 210 of the second support member 200 by passing through the receiving holes H1 of the third plate 300.

Even when the second support member 200 receives the vibration from the ground or the serving robot apparatus 1000, the first support member 100 spaced apart from the second support member 200 may receive vibration from the second support member 200 through the rolling member 400.

When the first supporting member 100 is supported by the rolling member 400 performing a rolling movement, the first supporting member 100 may be sufficiently insensitive to vibration of the second supporting member 200 and may receive vibration in a sufficiently attenuated state. Accordingly, the liquid contained in the cup C supported by the first support member 100 may not be discharged to the outside of the cup C.

The third plate 300 may include a first central hole H2. The first central hole H2 may be formed by penetrating the third plate 300 in a thickness direction.

The cup holding apparatus 1 according to an embodiment of the disclosure may further include the block member 500. The block member 500 may protrude from the lower surface 120 of the first support member 100 toward the second support member 200. The block member 500 may be integrally formed with the first support member 100 and may move at the same speed as the first support member 100.

The block member 500 may be disposed in the first central hole H2 and may be surrounded by an inner circumferential surface 310 of the third plate 300.

The block member 500 may have a cylindrical shape, and an outside diameter of the block member 500 may be smaller than the inside diameter of the first center hole H2 of the third plate 300.

The block member 500 may not be in contact with the inner circumferential surface 310 of the third plate 300 when the first support member 100 is not displaced relative the second support member 200 (i.e., at a normal resting position), and the block member 500 may be in contact with the inner circumferential surface 310 of the third plate 300 when the first support member 100 is displaced larger than a predetermined amount from the center of the second support member 200.

When the block member 500, which is integrally formed with the first support member 100, moves in a state of being in contact with the inner circumferential surface 310 of the third plate 300, the third plate 300 may be pushed by the block member 500. At this time, the rolling member 400 supported by the third plate 300 may not perform a complete rolling movement, and move in an area in contact with the first and second support members 100 and 200 while slipping, so as to receive a large frictional force from the first and second support members 100 and 200.

An operation of the first support member 100 according to the block member 500 will be described in detail with reference to FIGS. 4 and 5.

Figure 4:
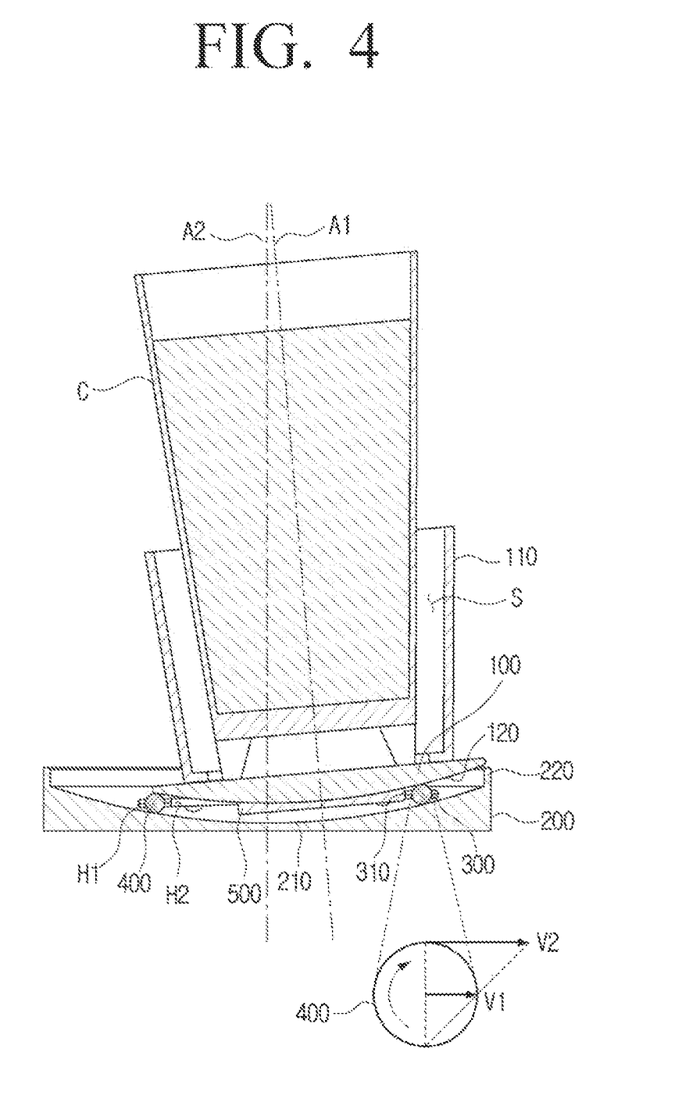
FIG. 4 is a diagram illustrating a state in which a block member is in contact with a third plate.

FIG. 4 is a diagram illustrating a state in which a block member is in contact with a third plate. FIG. 5 is a diagram illustrating a state in which a third plate is in contact with a second support member.

Referring to FIG. 4, when the rolling member 400 performs a rolling movement in which the rotational motion and a translational motion are combined, the lower contact speed of the rolling member 400 contacting the second support member 200 may be 0, the center of the rolling member 400 may be moved by the speed of the V1, and the upper contact speed of the rolling member 400 contacting the lower surface 120 of the first support member 100 may be V2. The third plate 300 and the rolling member 400 may move at the speed of V1, and the first support member 100 and the block member 500 integrally formed with the first support member 100 may move at the speed of V2. The magnitude of V2 may be greater than the magnitude of V1, for example, greater by approximately two times.

Since the block member 500 moves faster than the third plate 300, the side surface of the block member 500 may come into contact with the inner circumferential surface 310 of the third plate 300 when the first axis A1 of the first support member 100 is increased to a predetermined angle (e.g., about five degrees) with respect to the second axis A2 of the second support member 200.

When the block member 500 which is in contact with the inner circumferential surface 310 of the third plate 300 moves while pushing the third plate 300, the rolling member 400 may slip and move in a portion in contact with the first and second support members 100 and 200 without a complete rolling movement.

Since the rolling member 400 may move while being pushed along the upper surface 210 of the second support member 200, the friction resistance between the first and second support members 100 and 200 and the rolling member 400 may be increased.

The rolling member 400 may be rapidly decelerated, and the third plate 300 which moves at the same speed as the rolling member 400 may be rapidly decelerated as well.

Since the block member 500 moves with the third plate 300 while pushing the inner circumferential surface 310 of the third plate 300, the block member 500 may be decelerated with the same speed as the third plate 300.

Accordingly, when the first support member 100 moves further than a predetermined angle from the center of the second support member 200, the rolling member 400 may be rapidly decelerated due to a slip friction force that is greater than the rolling friction force from the first and second support members 100 and 200.

Since the third plate 300 and the block member 500 are decelerated with the same speed as the rolling member 400, the first support member 100 integrally formed with the block member 500 may also be sufficiently decelerated to prevent the first support member 100 from being separated from the upper surface 210 of the second support member 200.

Since the movement range of the first support member 100 is limited to the upper surface 210 of the second support member 200 according to the structure of the third plate 300 and the block member 500 described above, the first support member 100 may be spaced apart from the upper surface 210 of the second support member 200 and may not overturn. Accordingly, the first supporting member 100 may more safely support the cup C.

The second support member 200 may also include the sidewall 220 surrounding the upper surface 210 of the second support member 200. The sidewall 220 of the second support member 200 may be provided at an outer end of the second support member 200 and may extend higher than the upper surface 210 of the second support member 200.

The height of the sidewall 220 of the second support member 200 may be formed to correspond to the diameter of the rolling member 400. The first support member 100 may not be in contact with or collide with the sidewall 220 of the second support member 200 even when pendulum motion occurs.

Figure 5:
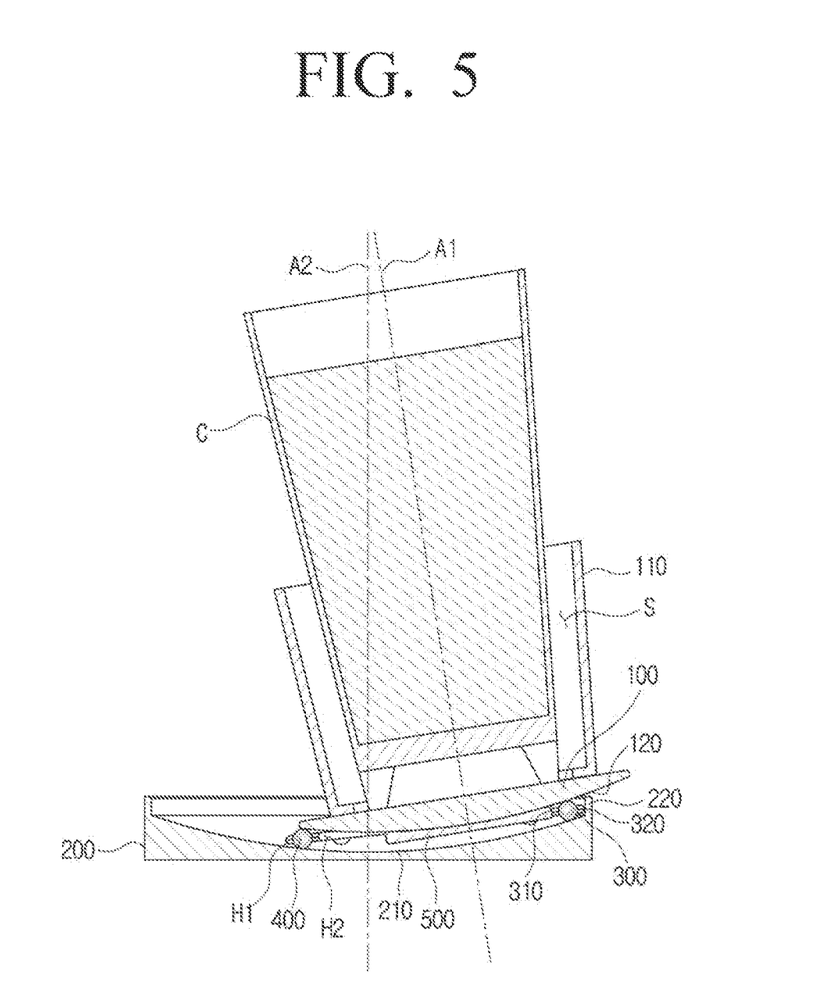
FIG. 5 is a diagram illustrating a state in which a third plate is in contact with a second support member.

Referring to FIG. 5, when the block member 500 in contact with the inner circumferential surface 310 of the third plate 300 at the position of FIG. 3 moves while pushing the third plate 300, the outer circumferential surface 320 of the third plate 300 may come into contact with the sidewall 220 of the second support member 200. Accordingly, the third plate 300 and the rolling member 400 may collide with each other and stop instantaneously, and may move in the opposite direction back toward the second axis A2 of the second support member 200 due to gravitational force.

When the first support member 100 is sufficiently decelerated according to the structure of the third plate 300 and the block member 500 described above, since the outer circumferential surface 320 of the third plate 300 and the sidewall 220 of the second support member 200 collide with each other, the risk of separation or rollover of the first support member 100 may be minimized.

Figure 6:
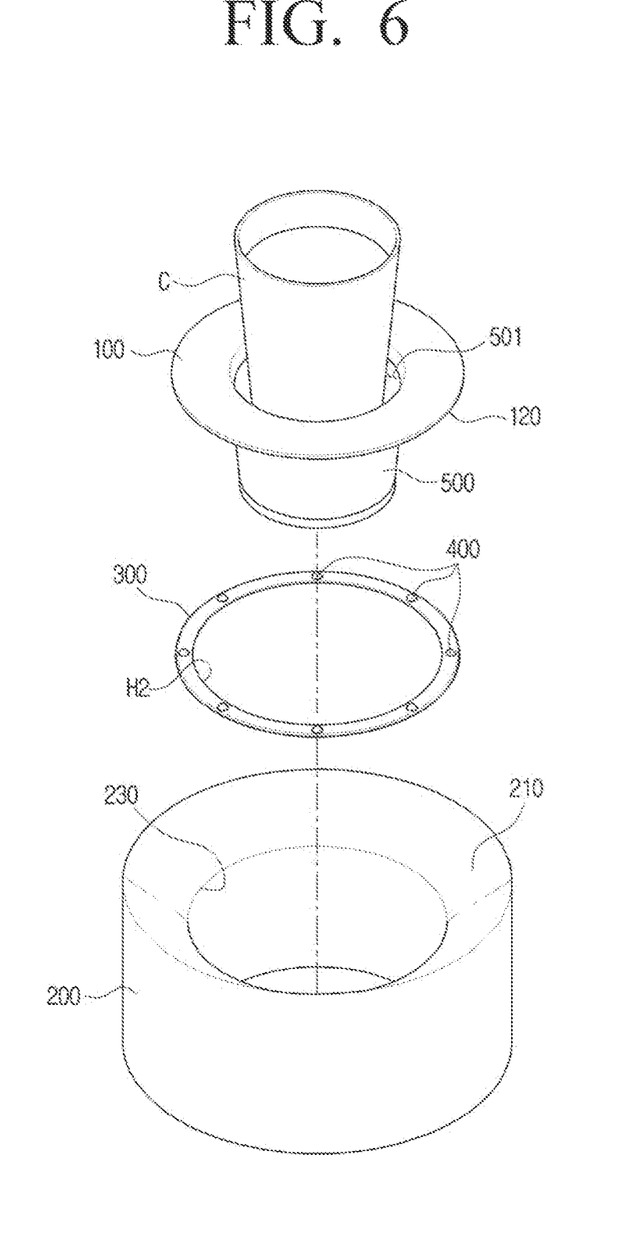
FIG. 6 is an exploded perspective view of a cup holding apparatus according to another embodiment of the disclosure.

FIG. 6 is an exploded perspective view of a cup holding apparatus according to another embodiment of the disclosure. As a part of the configurations of FIG. 6 has the same structure as described above, the same reference numeral will be used and a description thereof may be omitted.

Referring to FIG. 6, the second support member 200 may include a second central hole 230, and the block member 500 may pass through the first central hole H2 and may be disposed at the second central hole 230.

The second central hole 230 may be formed vertically downward from the upper surface 210 of the second support member 200. The block member 500 may be disposed in the second central hole 230 and may be surrounded by the inner circumferential surface of the second support member 200. The height of the block member 500 may be less than the depth of the second central hole 230.

The outside diameter of the third plate 300 may be greater than the diameter of the second central hole 230. Accordingly, even when the third plate 300 is moved, the third plate 300 does not move into the second central hole 230, and may move over the upper surface 210 of the second support member 200.

Movement of the block member 500, which moves integrally with the first support member 100, may be limited by the inner wall of the second support member 200 as well as the third plate 300. Accordingly, since the first support member 100 supporting the cup C is not separated from the second support member 200, the cup C may be safely transferred to the target position.

The block member 500 may include a third central hole 501 surrounding a lower region of the cup C, and may support a lower surface of the cup C. The block member 500 may include the third central hole 501 of which a lower surface is blocked, and the inner wall of the block member 500 may surround a lower region of the cup C. The depth of the third center hole 501 may be approximately half of the height of the cup C, but is not limited thereto and the cup C may have other heights.

The user may insert the cup C to a third central hole 50 of the block member 500 to be supported at a lower surface of the block member 500.

Even if the cup C is unintentionally tilted, the cup C is supported by the inner wall of the block member 500, so that the cup C is not separated from the block member 500 and may not fall, and thus may be safely transferred to the target position.

FIG. 7 is a perspective view of a serving robot apparatus according to an embodiment of the disclosure.

Referring to FIG. 7, the serving robot apparatus 1000 may include a main body 1100, a driving device configured to move the main body 1100, and a cup holding device 1 horizontally supported by the main body 1100. The serving robot apparatus 1000 may also include a display 1300 that represents a serving state (e.g., a type of food, an arrival table location, etc.). The driving device may include a motor to drive wheels on a lower surface of the main body 1100.

The serving robot apparatus 1000 may include a plurality of tray members 1200 horizontally disposed in parallel with each other, and the cup holding apparatus 1 may be detachably fixed to at least one of the plurality of tray members 1200.

Although it is illustrated that two cup holding apparatuses 1 are provided in the uppermost tray member 1200, the position of the tray member 1200 on which the cup holding apparatus 1 is disposed and/or the number of the cup holding apparatuses 1 is not limited thereto.

The user may set the serving robot apparatus 1000 to move to the target point while supporting the cup C in which the beverage is contained in the cup holding apparatus 1. Accordingly, the serving robot apparatus 1000 may move to the target position while supporting the cup holding apparatus 1.

As described above, as the first supporting member 100 supporting the cup C is supported by the rolling member 400 performing a rolling movement, the first support member 100 supporting the cup C may be sufficiently insensitive to vibration of the second support member 200 and may receive vibration in a sufficiently attenuated state (i.e., vibration that is reduced relative to vibration of the second support member 200). Accordingly, the liquid contained in the cup C supported by the first support member 100 may not be discharged to the outside of the cup C.

In addition, according to the structure of the third plate 300 and the block member 500 described above, since the first support member 100 is separated from the upper surface 210 of the second support member 200 and may not overturn, the first support member 100 may support the cup C more securely.

While the present disclosure has been shown and described with reference to example embodiments thereof, it will be understood by those of ordinary skill in the art that various changes in form and details may be made therein without departing from the spirit and scope of the disclosure claimed in the claims.

What is claimed is:

1. A cup holding apparatus comprising:
a first support member configured to support a cup and having a lower surface that has convex shape;
a second support member having an upper surface that has a concave shape and faces the lower surface of the first support member;
a third plate provided between the first support member and the second support member, wherein the third plate comprises a first central hole;
a block member that protrudes toward the second support member from the lower surface of the first support member and is disposed in the first central hole; and
a plurality of rolling members that pass through and are rotatably supported by the third plate, and contact the lower surface of the first support member and the upper surface of the second support member,
wherein the block member is configured not to contact an inner circumferential of the first central hole of the third plate when the first support member is not displaced relative to a center of the second support member, and
wherein the block member is configured to contact the inner circumferential surface of the first central hole of the third plate when the first support member is displaced relative to the center of the second support member by a certain amount.

2. The cup holding apparatus of claim 1, wherein the block member has a cylindrical shape.

3. The cup holding apparatus of claim 1, wherein an outside diameter of the block member is smaller than an inside diameter of the first central hole.

4. The cup holding apparatus of claim 1, wherein the second support member comprises a second central hole, and
wherein the block member passes through the first central hole and is disposed in the second central hole.

5. The cup holding apparatus of claim 4, wherein the block member comprises a third central hole configured to surround a lower region of the cup and support a lower surface of the cup.

6. The cup holding apparatus of claim 1, wherein the plurality of rolling members are disposed along a circumferential direction of the third plate.

7. The cup holding apparatus of claim 1, wherein the third plate has a cylindrical shape.

8. The cup holding apparatus of claim 1, wherein the second support member comprises a sidewall that surrounds the upper surface of the second support member and extends to a level that is higher than the upper surface of the second support member.

9. The cup holding apparatus of claim 1, wherein the first support member comprises a holder configured to surround a lower region of the cup.

10. A serving robot apparatus comprising:
a main body;
a driving device configured to move the main body;
a cup holding apparatus horizontally supported by the main body,
wherein the cup holding apparatus comprises:
a first support member configured to support a cup and having a lower surface that has convex shape;
a second support member having an upper surface that has a concave shape and faces the lower surface of the first support member;
a third plate provided between the first support member and the second support member, wherein the third plate comprises a first central hole;
a block member that protrudes toward the second support member from the lower surface of the first support member and is disposed in the first central hole; and
a plurality of rolling members that pass through and are rotatably supported by the third plate, and contact the lower surface of the first support member and the upper surface of the second support member,
wherein the block member is configured not to contact an inner circumferential surface of the first central hole of the third plate when the first support member is not displaced relative to a center of the second support member, and
wherein the block member is configured to contact the inner circumferential surface of the first central hole of the third plate when the first support member is displaced relative to the center of the second support member by a certain amount.

11. The serving robot apparatus of claim 10, wherein the block member has a cylindrical shape, and an outside diameter of the block member is smaller than an inside diameter of the first central hole.

12. The serving robot apparatus of claim 10, wherein the second support member comprises a second central hole, and
wherein the block member passes through the first central hole and is disposed in the second central hole.

13. The serving robot apparatus of claim 12, wherein the block member comprises a third central hole configured to surround a lower region of the cup and support a lower surface of the cup.

14. The serving robot apparatus of claim 10, wherein the plurality of rolling members are disposed along a circumferential direction of the third plate.

15. The serving robot apparatus of claim 10, wherein the third plate has a cylindrical shape.

16. The serving robot apparatus of claim 10, wherein the second support member comprises a sidewall that surrounds the upper surface of the second support member and extends to a level that is higher than the upper surface of the second support member.

17. The serving robot apparatus of claim 10, wherein the first support member comprises a holder configured to surround a lower region of the cup.

* * * * *